UNITED STATES PATENT OFFICE.

LUDWIG SCHOLVIEN, OF BERLIN, GERMANY, ASSIGNOR TO J. D. RIEDEL, OF SAME PLACE.

IODINE DERIVATES OF ACETYL PARAMIDO-PHENETOLE.

SPECIFICATION forming part of Letters Patent No. 472,828, dated April 12, 1892.

Application filed September 1, 1891. Serial No. 404,451. (No specimens.) Patented in Germany June 19, 1891, No. 58,409.

*To all whom it may concern:*

Be it known that I, LUDWIG SCHOLVIEN, chemist, a subject of the Emperor of Germany, residing in the city of Berlin and German Empire, have invented certain new and useful Improvements in the Production of Iodine Derivates of Acetyl Paramido-Phenetole, (for which Letters Patent were granted in Germany to J. D. Riedel, dated June 19, 1891, and numbered 58,409;) and I do hereby declare the following to be a full, clear, and exact description of the invention, such as will enable others skilled in the art to which it appertains to make and use the same.

The invention relates to the production of iodine derivates of acetyl paramido-phenetole; and it consists in a novel process of producing the derivates and in the product obtained thereby, as will now be described.

When a solution of acetyl paramido-phenetole in water, acetic acid, or alcohol is mixed with a solution of iodine in potassium iodide or any other solvent of iodine, the solution will remain clear; but if an acid is added, especially hydrochloric acid, a copious separation of fine brown-red and brilliant needles takes place at once. Inasmuch as a great many experiments under the conditions referred to invariably resulted in the same final product, it will suffice to give three examples in their quantitative course.

By mixing a solution of three hundred grams of acetyl paramido-phenetole in glacial acetic acid with four hundred and fifty grams of hydrochloric acid of about thirty-eight per cent. and fifteen hundred grams of water and a solution of three hundred and forty grams of iodine in a potassium-iodide solution of about six hundred and fifty grams of the iodide and six hundred and fifty grams of water a beautiful brown-red substance in the form of needle-like crystals is obtained, which is separated from the liquid, washed in water, and dried, the iodine product thus obtained amounting to five hundred and eighty grams. On the other hand, a solution of three hundred grams of acetyl paramido-phenetole in two thousand two hundred and fifty grams of glacial acetic acid, when mixed with four hundred and fifty grams of hydrochloric acid of about thirty-eight per cent. and fifteen hundred grams of water and with three hundred and forty grams of iodine in a solution of six hundred and fifty grams of potassium iodide and six hundred and fifty grams of water, yielded five hundred and eighty grams of the iodine product. Thirdly, a solution of three hundred grams of acetyl paramido-phenetole in six hundred grams alcohol, when mixed with three hundred grams iodine in solution in six hundred grams hydriodic acid of about fifty per cent., yielded five hundred and thirty grams of the same body. This product, when dried, consists of a powder composed of fine chocolate-brown needles that melt under decomposition at 130° centigrade. It is readily soluble in glacial acetic acid, not as readily soluble in acetic acid of about fifty per cent., quite soluble in alcohol, difficult of solution in benzole and chloroform, and nearly insoluble in water. The substance contains iodine and is characterized by the readiness with which it yields up its iodine. Combined with a solvent such as above described and heated or boiled the substance is slowly decomposed, the iodine being liberated. If, on the contrary, the iodine derivate is boiled for some time in water, iodine vapors pass off continuously, until finally the pure acetyl paramido-phenetole remains. The latter has been readily identified in the last-named experiments by its melting-point and the formation of amido-phenetole when treated with hydrochloric acid and sodium lye. The separation of the iodine takes place in a more energetic manner when the derivate is treated with an alkali or with sodium sulphate. Even very weak alkaline liquids—such as secretions from wounds—slowly decompose the derivate, and in view of this characteristic feature of the substance it is admirably adapted as an antiseptic and disinfectant and shows that in its formation the iodine has been added to the nitrogen of the acetyl paramido-phonetole instead of being an iodine substitution in the radicle.

The recrystallization of the substance is best effected in glacial acetic acid, from which it is obtained in large brilliant greenish-red columnar crystals. From chloroform, to which from five to ten per cent. of alcohol has been added, somewhat smaller crystals are obtained.

Analysis of the iodine derivate demonstrated it to be a body that contained three atoms of iodine to every two molecules of acetyl paramido-phenetole and whose empirical formula is $C_{20}H_{25}N_2O_4I_3$. The theoretical percentage of iodine according to this formula is 51.55. The actual percentage in the three examples given is 50.3, 50.8, and 51.4 per cent. The substance is tri-iodine-diacetyl paramido-phenetole, which I call "iodophenin."

Having thus described my invention, what I claim as new therein, and desire to secure by Letters Patent, is—

1. The process of obtaining iodophenin, which consists in combining a solution of acetyl paramido-phenetole with a solution of iodine.

2. The product herein described, which has the following characteristics: it melts under decomposition at 130° centigrade, is readily soluble in glacial acetic acid, not so readily soluble in acetic acid of fifty per cent., quite soluble in alcohol, difficultly soluble in benzole and chloroform, and nearly insoluble in water, it readily yields up its iodine under the action of an alkali or on boiling in its solvent, and has the empirical formula $C_{20}H_{25}N_2O_4I_3$.

LUDWIG SCHOLVIEN.

Witnesses:
HUGO MORTZFELZ,
AUG. WAHLER.